United States Patent
Williams et al.

(10) Patent No.: US 6,817,066 B1
(45) Date of Patent: Nov. 16, 2004

(54) HANDLE GRIP APPARATUS

(76) Inventors: Kenneth Williams, 4945 Grass Valley Hwy., Auburn, CA (US) 95602; Rita Gabriella Williams, 4945 Grassvalley Hwy., Auburn, CA (US) 95602

(*) Notice: Subject to any disclaimer, the term of this patent is extended or adjusted under 35 U.S.C. 154(b) by 0 days.

(21) Appl. No.: 10/392,714

(22) Filed: Mar. 20, 2003

(51) Int. Cl.[7] ............................................... A45C 13/22
(52) U.S. Cl. .................. 16/435; 16/110.1; 280/33.992; 150/154
(58) Field of Search ............................... 16/435, 110.1, 16/421, 422; 280/33.992, 33.993; 297/229; 248/104; 150/154, 52 R; 401/661.12

(56) References Cited

U.S. PATENT DOCUMENTS

| | | | | |
|---|---|---|---|---|
| 4,512,504 A | * | 4/1985 | Owlett | 224/572 |
| D287,370 S | * | 12/1986 | Stoll et al. | D18/7 |
| 4,805,937 A | * | 2/1989 | Boucher et al. | 280/33.992 |
| 4,955,914 A | * | 9/1990 | Caniglia et al. | 606/235 |
| 5,429,377 A | * | 7/1995 | Duer | 280/33.992 |
| 5,702,039 A | * | 12/1997 | Olaiz | 224/409 |
| 5,715,571 A | * | 2/1998 | Fasano | 16/436 |
| 5,722,672 A | * | 3/1998 | Frederick | 280/33.992 |
| 5,820,142 A | * | 10/1998 | Duer | 280/33.992 |
| 5,829,656 A | * | 11/1998 | Reitz et al. | 224/417 |
| D403,549 S | * | 1/1999 | Dudash | D6/610 |
| 5,855,412 A | * | 1/1999 | Smith et al. | 297/256.17 |
| 6,065,764 A | * | 5/2000 | Moseley | 280/33.992 |
| 6,543,794 B1 | * | 4/2003 | Tyree | 280/33.992 |
| 6,604,789 B1 | * | 8/2003 | Downing | 297/227 |

* cited by examiner

*Primary Examiner*—Suzanne Dino Barrett
*Assistant Examiner*—Mark Williams (57) ABSTRACT

A sanitary grip apparatus for preventing direct contact with unsanitary shopping cart handles that may be installed without touching the shopping cart handle directly. To attain this, a section of foam tubing having a longitudinal slit there through is provided, where a pair of pull-tabs is arranged on either side of the slit such that the tubing can be pulled open and installed onto the shopping cart handle. In an embodiment, the grip may include clip, pocket, pouch, attachment region, toys, mirror, book, key ring, or calculator. Also, a method for using a shopping cart without touching it directly.

9 Claims, 5 Drawing Sheets

HANDLE GRIP APPARATUS

BACKGROUND OF THE INVENTION

1. Field of the Invention

The present invention relates to sanitary shopping cart handle covers, and more specifically to reusable prophylactic shopping cart handle grips that are manufactured from a non-toxic material that may be safely mouthed by a teething child seated in the shopping cart, and that have additional convenience features, thus satisfying the needs of specific users while simultaneously making the shopping carts, upon which the grips are mounted, distinguishable from one another.

2. Description of the Related Art

Handle grips are desirable for making pushing various devices, such as shopping carts, comfortable. For example, typical shopping carts are made of metal, and have plastic handle grips arranged on the handle of the metal carts. The plastic handle grips are typically of a larger diameter than the metal tubing from which the shopping cart is made, and may have finger recessions on the underside to make the handle more comfortable. However, numerous people throughout the course of a day will touch the same handles. Such plastic handle grips are therefore very likely to receive germs from each user. As such, avoiding touching these plastic handle grips may prevent the spread of colds, flu's, and other illness. Consequently, personal handle grips are desirable. That is, it is desirable to have one's own handle grip, which can be placed over the standard plastic handle grips. It is also desirable to have a handle grip that may be easily arranged over the standard plastic handle grips without directly touching the plastic handle grip. However, it may also be desirable to have a various handle grips to satisfy the needs of each particular user. Such variety will help to differentiate the handle grips such that users do not inadvertently grab someone else's handle grip, confusing it with their own. To this end, it is desirable to have a personal handle grip configured to hold, for example, a shopping list, or a calculator. Still further, it is desirable to have a personal handle grip having a zippered pouch. It is also desirable to have a personal handle grip having toys to occupy children riding in a shopping cart, where the personal handle grip and toys are constructed of material that may be safely mouthed by a teething baby. Also, it is desirable to have a personal handle grip having incorporated key fob, telephone book, cel phone pocket, picture frames, or Velcro receiving pad such that a user could affix another item of their choosing to the handle grip.

The use of handle covers is known in the prior art. For example, U.S. Pat. No. 6,065,764 to Moseley discloses a sanitary teething cover for a shopping cart handle that is to be mouthed by a child or infant.

U.S. Pat. No. 5,215,319 to Farris discloses a single rolled sheet of semi-rigid plastic in the preferred embodiment of the invention. The rolled sheet is cut longitudinally along one side, with a notch, to facilitate the placement of the cover onto a shopping cart handle. The handle cover is also individually wrapped to further maintain its sanitary state until the time of use. An alternative embodiment of the handle cover of Farris '319 illustrated in FIG. 9, involves mounting a roll of plastic wrap, or other disposable material, with a cutting edge on the cart near the handle, so that each successive customer can pull a length of plastic wrap sufficient to cover the handle. Both of these embodiments would produce a significant increase in plastic waste, contributing to the deluge of disposable plastic products currently employed in stores. Unlike plastic bags and food containers, however, the used handles could not be recycled, given the accumulation of germs on their surfaces. Beyond being environmentally unsound, these embodiments also fail to adequately address the teething problem, as the plastic wrap would not have the integrity to withstand teething. Moreover, this material would provide a choking hazard to a teething child.

Similarly, U.S. Pat. No. 5,429,377 to Duer discloses a sanitary protective cover for shopping cart use that is attached to a bag into which the protective cover may be inserted when the cover is folded. However, the Duer '377 patent does not disclose a handle grip apparatus including a tubular member having a longitudinal slit with pull-tabs attached thereto, allowing the grip to be installed on a shopping cart without directly touching the shopping cart handle.

U.S. Pat. No. 4,881,746 to Andreesen discloses a handle cover and toy holder that includes a cloth handle cover and attached toy holder where the toy holder is configured to secure the folded cloth handle cover when not in use. However, the Andreesen '746 patent does not disclose a handle grip apparatus including a tubular member having a longitudinal slit with pull-tabs attached thereto, allowing the grip to be installed on a shopping cart without directly touching the shopping cart handle.

U.S. Pat. No. 2,803,849 to Peters discloses a continuous tubular paper cover that slips onto a specially designed shopping cart handle having one end that removably engages with the body of the cart. However, the sanitary handle cover of Peters '849 is not compatible with conventional shopping carts, and would incur an immense expense for stores to replace their supply of conventional carts or to install the special handles thereon. Furthermore, the handle cover of Peters '849 is paper, through which a teething child could easily and quickly chew, making it unsatisfactory as a prophylactic device and potentially presenting a choking hazard.

Lastly, U.S. Design Pat. No. 328,812 to Pritchett discloses a handle cover for a shopping cart that appears to be made of a strip of fabric having Velcro along a longitudinal edge to secure the fabric to the shopping cart handle. However, the Pritchett '812 patent does not appear to disclose a handle grip apparatus including a tubular member having a longitudinal slit with pull-tabs attached thereto, allowing the grip to be installed on a shopping cart without directly touching the shopping cart handle.

While the above-described devices fulfill their respective, particular objectives and requirements, the aforementioned patents do not describe a handle grip apparatus that allows the grip to be installed on a shopping cart without directly touching the shopping cart handle. The Mosley '764 patent makes no provision for installing a sanitary cover without directly touching the handle.

Therefore, a need exists for a new and improved handle grip apparatus that can be used for installing a sanitary handle grip apparatus without soiling one's hands by touching the shopping cart handle. In this regard, the present invention substantially fulfills this need. In this respect, the handle grip apparatus according to the present invention substantially departs from the conventional concepts and designs of the prior art, and in doing so provides an apparatus primarily developed for the purpose of allowing use of a public shopping cart without touching the handle, while providing conveniences to the shopper.

SUMMARY OF THE INVENTION

In view of the foregoing disadvantages inherent in the known types of handle covers now present in the prior art, the present invention provides an improved handle grip apparatus, and overcomes the above-mentioned disadvantages and drawbacks of the prior art. As such, the general purpose of the present invention, which will be described subsequently in greater detail, is to provide a new and improved handle grip apparatus and method of using a shopping cart without directly touching the shopping cart handle which has all the advantages of the prior art mentioned heretofore and many novel features that result in a handle grip apparatus which is not anticipated, rendered obvious, suggested, or even implied by the prior art, either alone or in any combination thereof.

To attain this, the present invention essentially comprises a grip apparatus that is constructed from a flexible material formed into a tube, where the tube has a slit from an inner circumference extending radially to the outer circumference, where the slit extends along the length of the tube, and where attached to the tube are two pull-tabs, one arranged on either side of the slit, where the pull-tabs may be used to pull the tube apart at the slit, allowing the tubular grip apparatus to be installed on a shopping cart handle. The embodiments of the present invention may include various elements to facilitate the user's shopping experience.

There has thus been outlined, rather broadly, the more important features of the invention in order that the detailed description thereof that follows may be better understood and in order that the present contribution to the art may be better appreciated.

The invention may also include clips, toys, pockets, and other objects to facilitate shopping. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved handle grip apparatus that has all of the advantages of the prior art handle covers and none of the disadvantages.

It is another object of the present invention to provide a new and improved handle grip apparatus that may be easily and efficiently manufactured and marketed.

An even further object of the present invention is to provide a new and improved handle grip apparatus that has a low cost of manufacture with regard to both materials and labor, and which accordingly is then susceptible of low prices of sale to the consuming public, thereby making such handle grip apparatus economically available to the buying public.

Still another object of the present invention is to provide a new handle grip apparatus that provides in the apparatuses and methods of the prior art some of the advantages thereof, while simultaneously overcoming some of the disadvantages normally associated therewith.

Even still another object of the present invention is to provide a handle grip apparatus for providing storage for items useful to a shopper.

Still yet an other object of the present invention is to provide a handle grip apparatus for providing entertainment to a child seated in a shopping cart.

Lastly, it is an object of the present invention to provide a new and improved method for using a shopping cart without directly touching the shopping cart handle.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Referring now to the drawings, and particularly to FIGS. 1–14, a preferred embodiment and alternate embodiments of the shopping handle grip apparatus of the present invention is shown and generally designated by the reference numeral 10.

Figure 1:
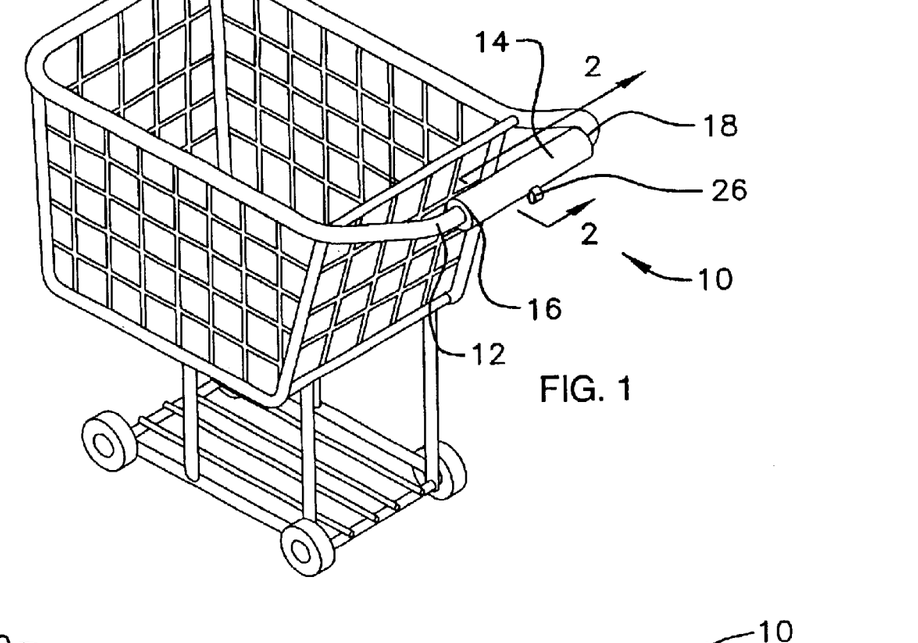
FIG. 1 is an environmental view of a preferred embodiment of the shopping cart handle grip of the present invention while installed on a shopping cart.

In FIG. 1, a new and improved shopping handle grip apparatus 10 of the present invention for providing a sanitary means to push public shopping carts is illustrated and will be described. More particularly, the tubular grip 10 removably engages a shopping cart handle 12 of a conventional shopping cart. Pull-tabs 26 provide a means to install the grip 10 without touching the surface of the shopping cart handle 12. In this embodiment, grip 10 in constructed from tubing 14. The tubing 14 comprises a non-toxic, hypoallergenic, durable, flexible material, wherein the material has memory. That is, the grip 10 may be malformed, such as required to install the grip as discussed below, however the grip 10 will return to its original form. In a preferred embodiment, the tubular grip 10 is constructed from dense foam rubber. The grip may be approximately 18 inches long and have a diameter of 1½ inches.

As noted, grip apparatus 10 is tubular. That is, the grip apparatus 10 is formed from a tube 14 where the tube has an inner circumference 20 and an outer circumference 22. When installed on a cart handle 12, the inner circumference 20 will be in contact with the cart handle 12. While in use, the outer circumference 22 will be gripped by the user's hands. The distance between the inner circumference 20 and the outer circumference 22 may be as much as 1 inch, although this distance is ¼ an inch in a preferred embodiment.

The handle grip 10 has a first end 16 and a second end 18, as shown in FIG. 1 arranged on the left and right sides, respectively, of the cart handle 12. The grip 10 is easily mountable and removable through use of pull-tabs 26, as discussed below. The grip 10 is constructed of a non-toxic, hypoallergenic material that is resilient and waterproof. The grip 10 may be easily cleaned. The grip 10 may be constructed of a material that is malleable yet that has memory such that the grip maintains it's original shape. In a preferred embodiment, the grip 10 is constructed from a material that can be safely mouthed by a teething child, such as foam rubber.

Figure 2:
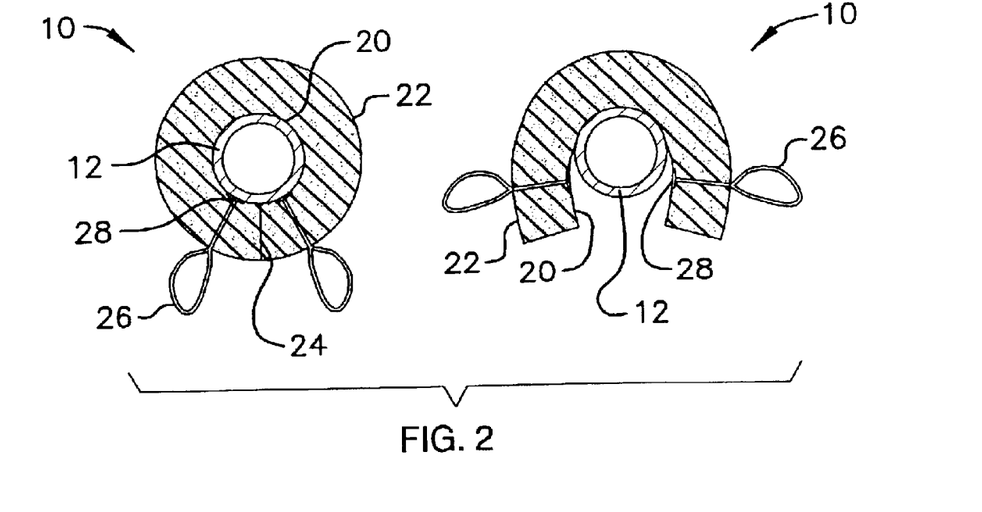
FIG. 2 is a cross-section view of a preferred embodiment of the shopping cart handle grip of the present invention. The cross-section is taken on line 2 of FIG. 1.

Turning to FIG. 2, the handle grip 10 is shown in cross-section, where the cross-section is taken on line 2 of FIG. 1. In the "CLOSED" view on the left, the handle grip 10 is shown as mounted on the cart handle 12. The inner circumference 20 is in contact with the cart handle. In the preferred embodiment shown, the inner circumference 20 is approximately the same as the outer circumference of the cart handle. In use, there may be some cart handles having circumferences larger or smaller than the inner circumference 20. As such, the distance between the inner circumference 20 and the outer circumference 22 is preferably great enough to distance the fingers from the larger, and thus partially uncovered, cart handle.

In order to mount the grip 10, there is a slit 24 extending radially from the inner circumference 20 to the outer circumference 22. The slit 24 extends from a first end 16 of the grip 1 to a second end 18 of the grip. This slit 24 allows the handle grip 10 to be opened so that it may be removably installed onto the cart handle 12. A pair of pull-tabs 26 is utilized to pull the handle grip 10 open at the slit 24 such that it can be installed onto the cart handle 12, as illustrated in the "OPEN" view on the right. The pull-tabs are grasped between a user's thumb and forefinger such that the grip 10 is pulled open at the slit 24. When open, the cart handle 12 may be inserted into the grip 10 such that the handle is adjacent the inner circumference 20 of the grip. Such installation may be performed without directly contacting the shopping cart handle 12 with one's hands.

The pull-tabs 26 may be, for example, tabs or loops. In the preferred embodiment shown, the pull-tabs 26 are nylon. However, the pull-tabs 26 may be made of fabric, plastic, or any suitable material. In an embodiment, the pull-tabs 26 are approximately 2 inches long and approximately ¾ inch wide. The pull-tabs 26 are affixed to pull-tab-anchors 28, where the pull-tab-anchor is arranged on the inner circumference side of the handle grip 10. The pull-tab-anchors are plastic in the preferred embodiment. In the preferred embodiment, the nylon pull-tabs 26 are fixably attached to the pull-tab-anchors 28. The pull-tabs 26 extend from their attachment to the pull-tab-anchors 28, extending radially from the inner circumference side of the grip, through the grip, and out from the outer circumference side of the grip. In the preferred embodiment shown, the pull-tab-anchors are circular. However, in an alternate embodiment, the pull-tab-anchors 28 may extend longitudinally along a length of the handle grip 10. In the preferred embodiment shown, a single pair of pull-tabs 26 is utilized, and they are arranged approximately midway between the first end 16 and the second end 18. However, the pair of pull-tabs may be arranged proximate to either end of the handle grip. Further, an additional pair or pairs of pull-tabs may be incorporated into the handle grip. For example, the handle grip 10 may have a pair of pull-tabs 26 arranged proximate to each end of the handle grip 10.

It is desirable that one users' grip 10 is not confused with another's. That is, if a user brings their own handle grip 10 to the store in order to avoid touching cart handles handled by other users, it is desirable that a user's personal grip is easily distinguishable from the others. Consequently, the grip 10 may be provided in a variety of colors. In addition, the grip may be personalized, having a name or particular word(s) printed on the outer circumference. Furthermore, each user may desire to keep various items of their choosing with them while they shop, and the user may wish to attach these items to the handle grip 10. As such, a user may desire alternate embodiments of the grip 10 as described below and as illustrated in FIGS. 3–14.

Figures 3, 4, 5:
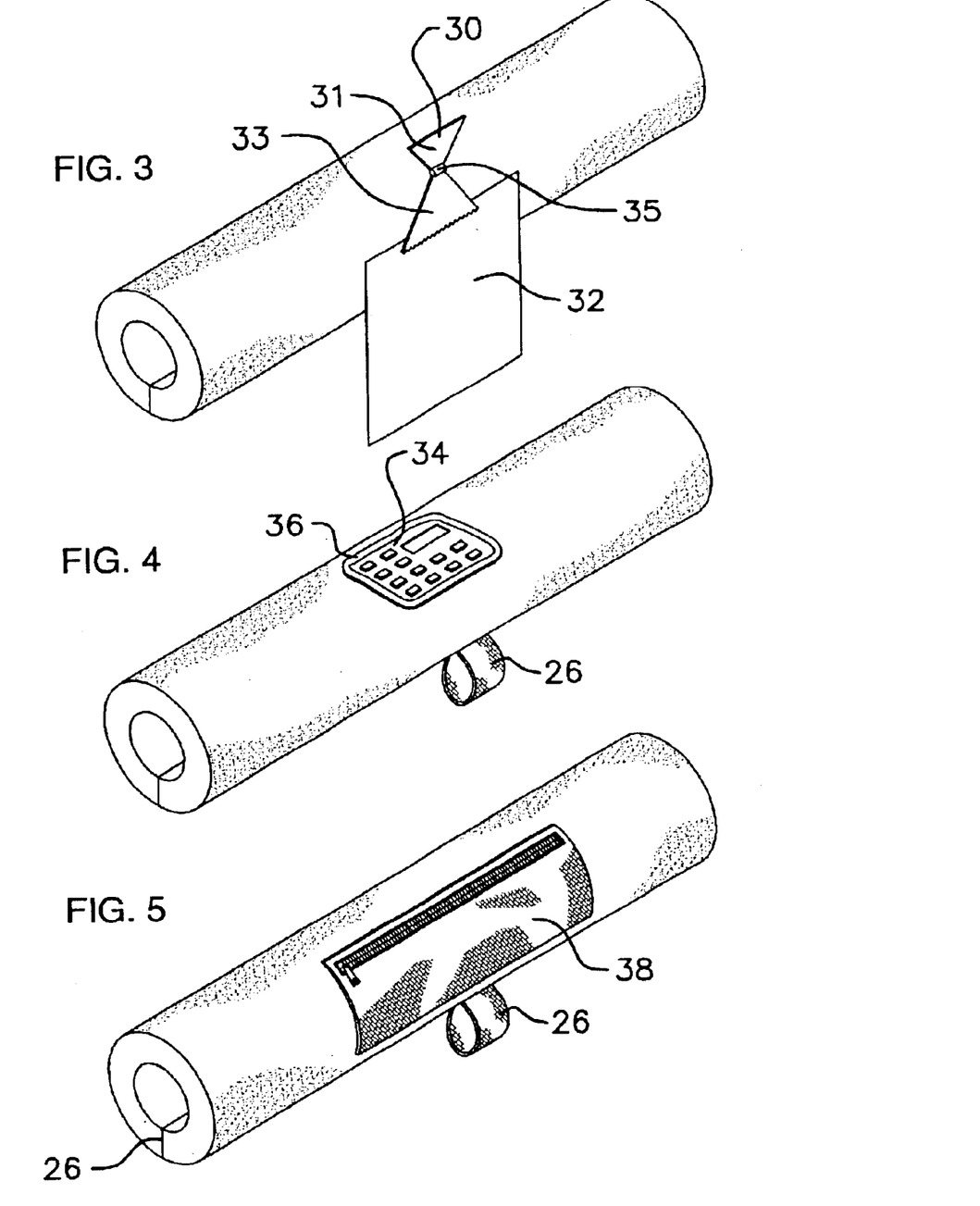
FIG. 3 is a perspective view of an alternate embodiment of the shopping cart handle grip of the present invention wherein the alternate embodiment includes a clip.
FIG. 4 is a perspective view of an alternate embodiment of the shopping cart handle grip of the present invention wherein the alternate embodiment includes a calculator.
FIG. 5 is a perspective view of an alternate embodiment of the shopping cart handle grip of the present invention wherein the alternate embodiment includes a zippered pouch.

Turning to FIG. 3, an alternate embodiment is illustrated. A clip 30 having an upper portion 31, a lower portion 33, and a spring mechanism 35, where the spring mechanism separates the upper portion from the lower portion, is shown. The spring mechanism 35 is attached to the outer circumference 22 of the grip 10. Pushing on the upper portion 31 of the clip 30 causes the lower portion 33 of the clip 30 to move away from the outer circumference 22 of the grip 10. Releasing the upper portion 31 allows the spring mechanism 30 to move the lower portion 33 of the clip 30 toward the outer circumference 22, thus capturing and holding an item 32, such a grocery list.

Turning to FIG. 4, an alternate embodiment is illustrated. A calculator 34 may be held to the outer circumference 22 of the grip 10 by a frame 36. The frame 36 is attached to the grip and is constructed from fabric in the preferred embodiment. The calculator 34 may be easily removed to facilitate cleaning or battery changes when necessary. In an embodiment, a Velcro closure is used on at least one of the four sides of the frame to facilitate placing and removing the calculator.

Turning to FIG. 5, an alternate embodiment is illustrated. A zippered pouch 38 may be incorporated onto the grip 10. Such a zippered pouch 38 is desirable because it would provide a handy storage area for coupons, keys, credit cards, etc that can be readily accessible while shopping. The pouch 38 would be constructed from cloth or nylon or any other suitable material. A zipper will extend across the top of the rectangular front of the pouch. The back of the pouch will be attached to the grip 10 at least across a top area of the pouch. The pouch may be substantially two-dimensional, as shown, or it may hang away from the grip and have significant depth, thus being substantially three-dimensional.

Figures 6, 7:
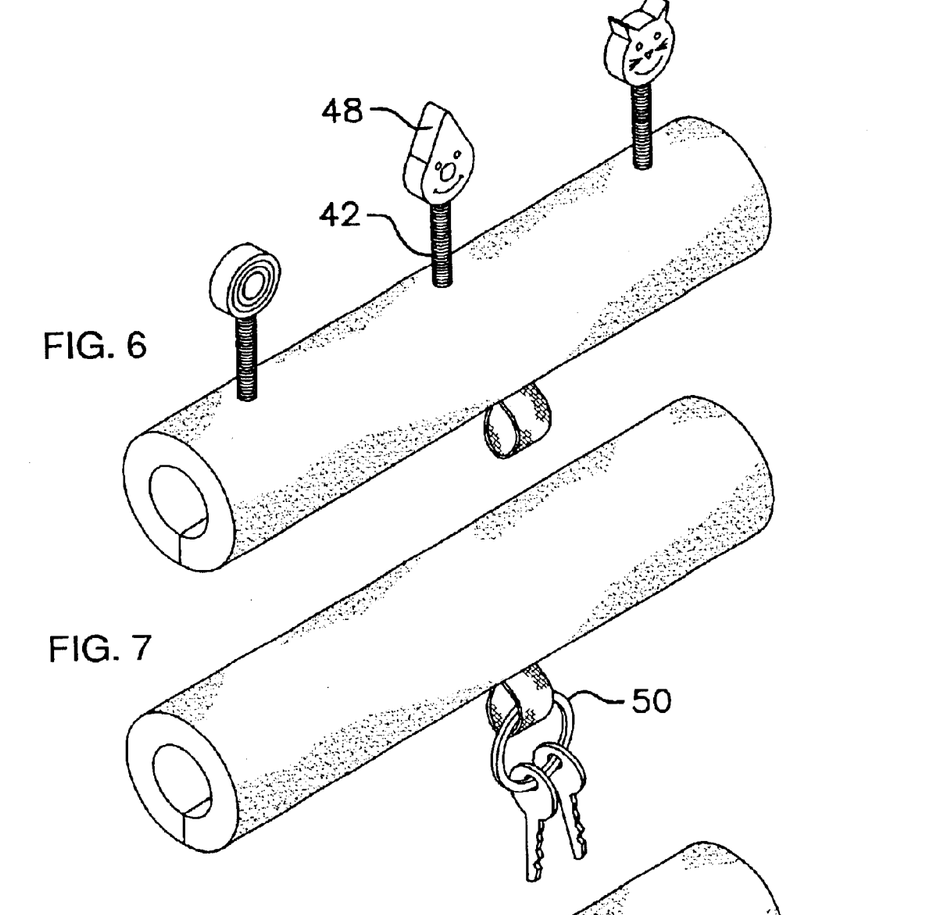
FIG. 6 is a perspective view of an alternate embodiment of the shopping cart handle grip of the present invention wherein the alternate embodiment includes toys.
FIG. 7 is a perspective view of an alternate embodiment of the shopping cart handle grip of the present invention wherein the alternate embodiment includes a key fob.

Turning to FIG. 6, an alternate embodiment is illustrated. In an alternate embodiment, the grip 10 may include toys to entertain a small child seated in the shopping cart. As shown, the grip may have at least one spring 42 attached thereto, where the spring is secured into the grip 10 between the inner circumference 20 and the outer circumference 22. A toy 48 is secured to the other end of the spring 42. Thus, the toy will "bob" on the spring to the delight of a seated child. The toy will be constructed of a non-toxic material that may be safely mouthed by a teething baby. The toy may be of any desirable ornamental design, such as puppies, kitties, clowns, etc.

Turning to FIG. 7, an alternate embodiment is illustrated. A key ring 50 is attached to the pull-tabs in this alternate embodiment. It is desirable to maintain a spare set of keys. A user may choose to keep such a set of keys on a key ring 50. Further, a user may want to place keys on their grip while shopping, and remove the keys upon leaving the store. In such a case, a quick release may be incorporated into the key ring 50, where the reciprocal end could be placed on a removable key ring, on which the keys would be arranged.

Figure 8:
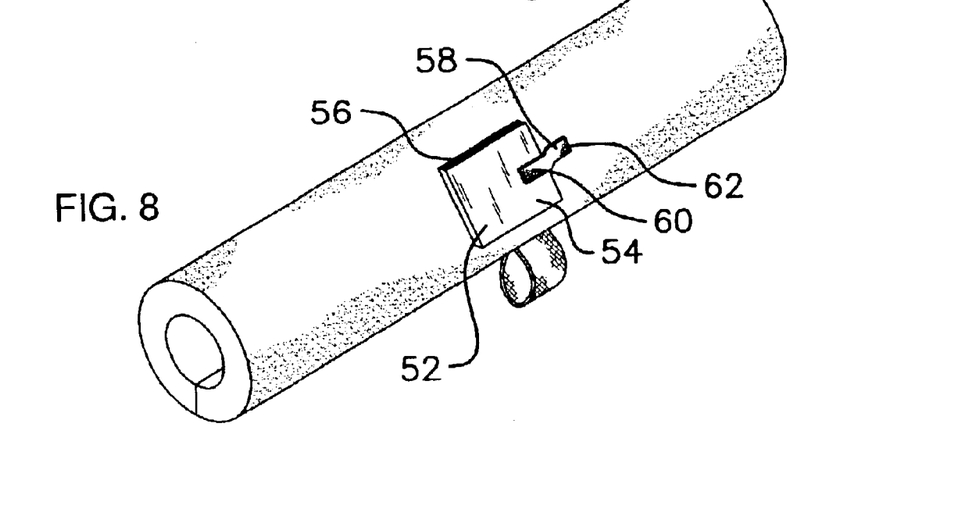
FIG. 8 is a perspective view of an alternate embodiment of the shopping cart handle grip of the present invention wherein the alternate embodiment includes a book.

Turning to FIG. 8, an alternate embodiment is illustrated. A user may desire to have a book 52 with them while shopping. Thus, it is desirable to incorporate a book onto the grip 10. Such a book 52 may maintain useful phone numbers. Such a book 52 could also maintain blank sheets for writing notes or maintaining shopping lists. Alternately, the book 52 could state inspirational messages for the recovering shopaholic. In the preferred embodiment shown, a back book cover 56 is attached to an outer circumference 22 of the grip 10. The front cover 54 would be held closed with a strap 58. Strap 58 comprises a proximal end 60 attached to the front cover 54, and a distal end 62 having an attachment means. Such attachment means may be Velcro, or a snap, or something similar to removably affix the strap to the grip such that the book remains closed when not in use.

Figure 9:
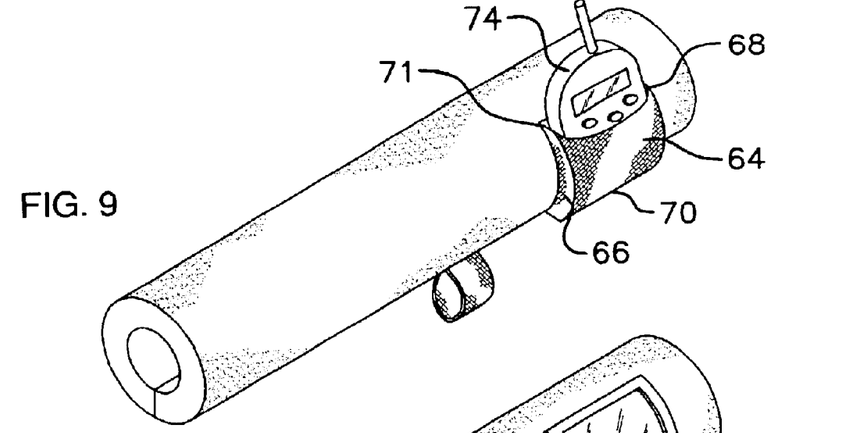
FIG. 9 is a perspective view of an alternate embodiment of the shopping cart handle grip of the present invention wherein the alternate embodiment includes an accessory pocket.

Turning to FIG. 9, an alternate embodiment is illustrated. A pocket 64 is attached to the grip 10. In a preferred embodiment, the pocket is nylon. However, the pocket may be constructed of any suitable material, such as fabric. The pocket includes at least three sides that are attached directly to an outer circumference of the grip 10 in the preferred embodiment. These three sides; the left side 66, right side 68 and bottom 70; are attached to the grip 10, either by stitching or heat bonding. The pocket 64 is of a size to accommodate a cellular phone 74. In yet another embodiment, the pocket has an attachment means attached on the back of the pocket. The pocket could be fastened to the grip where the grip has the reciprocal attachment. Reciprocal attachment means include, but are not limited to, Velcro, snaps, hook and eye closures, and button and buttonhole closures. Thus, in an alternate embodiment, a removably mounted pocket may be incorporated into the instant application.

Figures 10, 11:
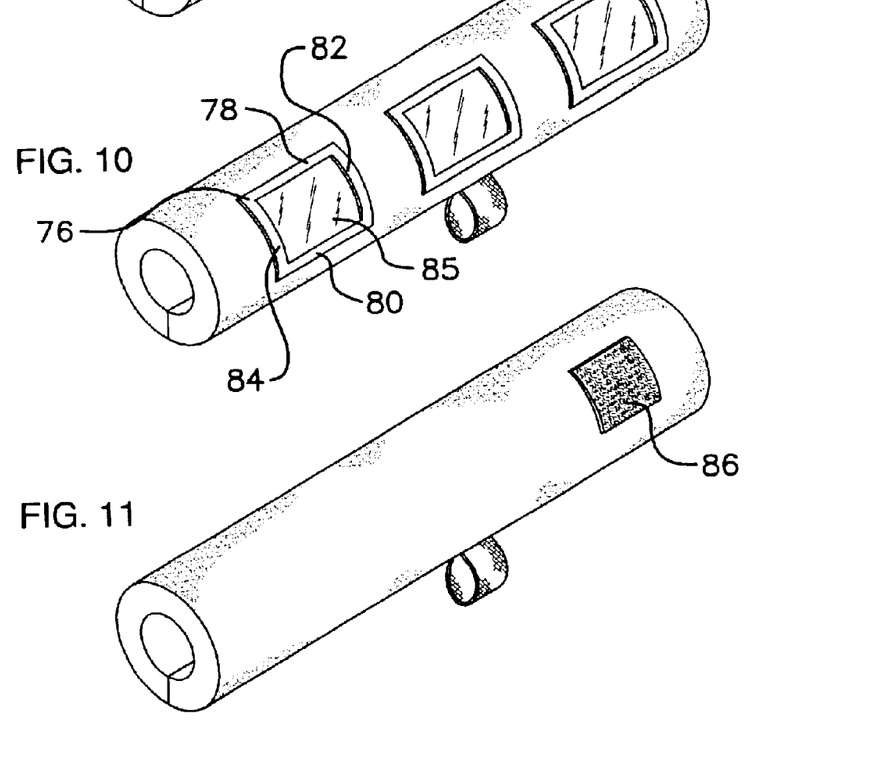
FIG. 10 is a perspective view of an alternate embodiment of the shopping cart handle grip of the present invention wherein the alternate embodiment includes windowed pockets.
FIG. 11 is a perspective view of an alternate embodiment of the shopping cart handle grip of the present invention wherein the alternate embodiment includes a mounting area.

Turning to FIG. 10, an alternate embodiment is illustrated. A series of three picture frames 76 is shown mounted to the outer circumference of the grip 10. Each frame 76 comprises a top 78, a bottom 80, a left side 84 and a right side 82. At least two of the four aforementioned sides are attached to the grip 10. The frame 76 is preferably heat bonded onto the grip. In an embodiment, the frames 76 may be molded onto the grip. A piece of paper or a photograph may be slid into the frame 76, either from the left or right side or from the top. The picture frame 76 may also comprise a transparent cover 85 to keep the frame contents clean.

Turning to FIG. 11, an alternate embodiment is illustrated. In the alternate embodiment shown, the grip includes an attachment region 86. An attachment region 86 is an area of the grip 10 having an attachment means thereupon. An attachment region 86 permits the user to attach to the grip an item of their choosing, providing the item has a reciprocal attachment means. The attachment region shown comprises Velcro hook fasteners. The Velcro hook fasteners are configured to receive Velcro loop fasteners. Velcro loop fasteners may be attached to a user-defined item, thus allowing the user to attach the item to the grip. Other attachment means include, but are not limited to, snap fasteners, hook and eye fasteners, button fasteners, and double sided tape. An attachment means may provide permanent or removable mounting of items.

Figures 12, 13, 14:
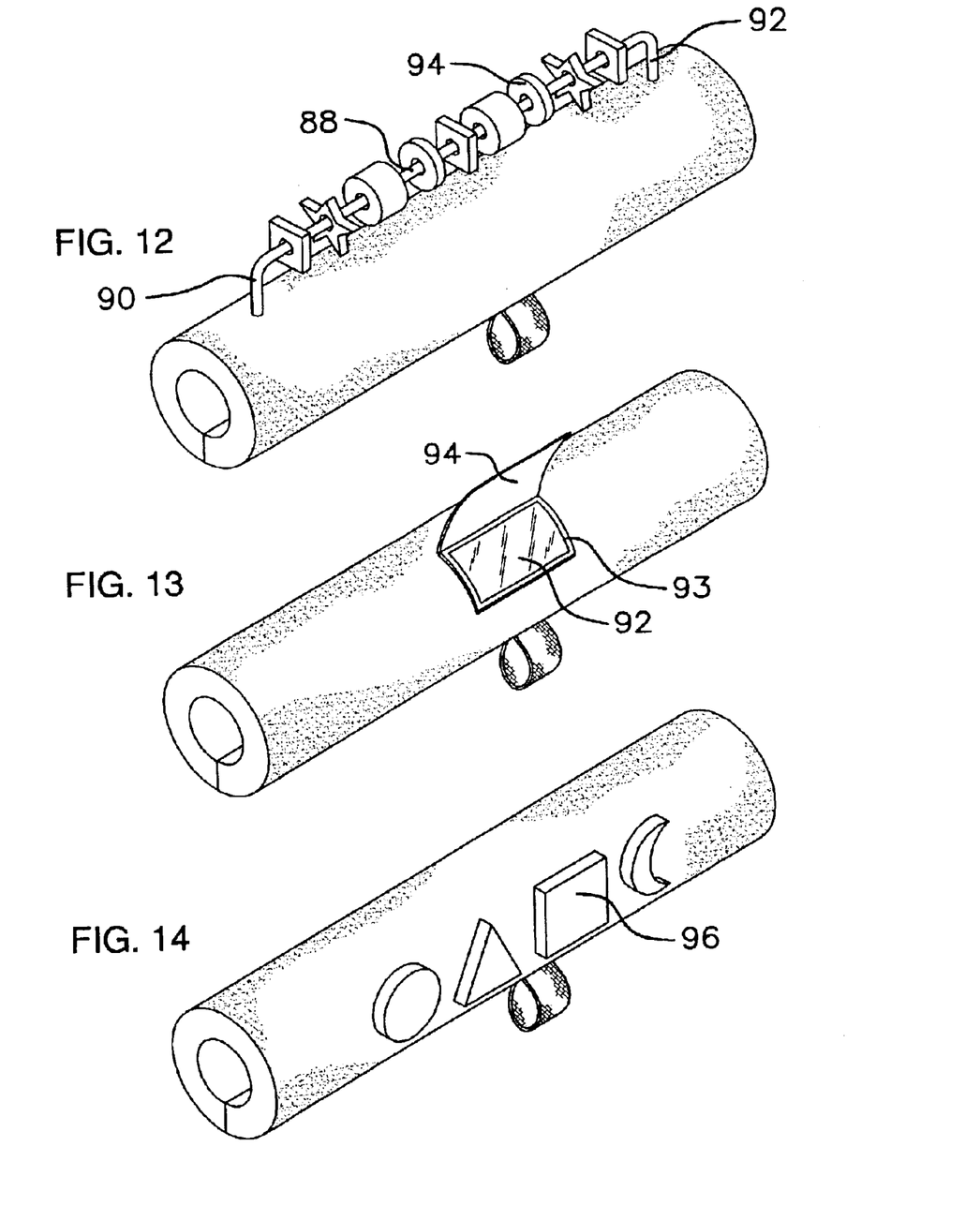
FIG. 12 is a perspective view of an alternate embodiment of the shopping cart handle grip of the present invention wherein the alternate embodiment includes a rod with movable toys.
FIG. 13 is a perspective view of an alternate embodiment of the shopping cart handle grip of the present invention wherein the alternate embodiment includes a mirror.
FIG. 14 is a perspective view of an alternate embodiment of the shopping cart handle grip of the present invention wherein the alternate embodiment includes push-button toys.

Turning to FIG. 12, an alternate embodiment is illustrated. As shown, a rod 88 may be mounted onto the grip. The rod 88 comprises a first end 90 arranged proximal to the first end of the grip and a second end 92 arranged proximal to the second end of the grip. The first and second ends of the rod 88 are fixably attached to the grip 10. Installed on the rod 88 are movable toys. The toys 94 are mounted on the rod such that they cannot be removed from the rod. The toys are of a material that may be safely mouthed by a teething baby. For example, the toys may comprise rubber or hard plastic. In an embodiment, the toys may have gradient sizes such that the toys can be used as an abacus. In an embodiment, the rod may have mounted thereupon beads, where the rod and the beads form an abacus. In such an embodiment, multiple rods may be employed. The abacus may be desirable for keeping a shopper on budget, and may serve a dual function as a child may also play with the beads when the beads are not used for counting.

Turning to FIG. 13, an alternate embodiment is illustrated. As shown, the grip 10 has an attached mirror 92. The mirror 92 is made of any suitable reflective material. The mirror may be held in a frame 93, where the frame is mounted to the grip. Or, the back of the mirror may be attached directly to the grip. A cover 94 may be arranged such that it opens to reveal the mirror, and closes to keep the mirror clean.

Turning to FIG. 14, an alternate embodiment is illustrated. As shown, fixably attached to the grip 10 is a series of push button toys 96. The push button toys 96 are configured to make noises upon the application of pressure. The push button toys 96 may be supplied in a variety of shapes, where the noise produced matches the shape. For example, the push button toys 96 may be shaped as shapes or numbers or letters, the name of which will be audible upon the application of pressure to the toy. As another example, the push button toys may be shaped as animals, and the toys may project the sound of each particular animal.

In use, it can now be understood that the handle grip apparatus is gripped by the pull-tabs. The pull-tabs are pulled away from each other. Upon pulling the pull-tabs one from the other, the handle grip opens along the slit, thus forming an open portion. This open portion is pressed onto the shopping cart handle, and the remainder of the handle may then be pressed onto the shopping cart handle such that the shopping cart handle is encircled by the grip. The grip has features such that each grip is distinctive, thus discouraging another shopper from mistaking the grip as their own and touching it. These distinctive features may provide storage for items useful to the shopper, or provide entertainment to a child seated in the shopping cart.

While a preferred embodiment of the handle grip apparatus has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any machine- or hand-washable material having properties such as flexibility, durability, non-toxicity, tear resistance and padded softness is suitable for manufacture instead of the foam rubber described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A sanitary grip apparatus that may be removably attached to a shopping cart handle by a user comprising:
    a section of tubing constructed from flexible material wherein the tubing comprises a first end and a second end, wherein the tubing comprises an inner circumference and an outer circumference, and wherein the tubing further comprises a slit extending radially from the inner circumference to the outer circumference and longitudinally from the first end to the second end;
    a pair of pull tabs, wherein each pull tab is arranged on an opposing side of the slit, and wherein each pull tab extends radially from a pull tab anchor arranged at the inner circumference, through the tubing, and extending beyond the outer circumference; and
    a calculator, wherein the outer circumference further comprises a frame configured to secure the calculator.

2. A sanitary grip apparatus that may be removably attached to a shopping cart handle by a user comprising:
    a section of tubing constructed from flexible material wherein the tubing comprises a first end and a second end, wherein the tubing comprises an inner circumference and an outer circumference, and wherein the tubing further comprises a slit extending radially from the inner circumference to the outer circumference and longitudinally from the first end to the second end;
    a pair of pull tabs, wherein each pull tab is arranged on an opposing side of the slit, and wherein each pull tab extends radially from a pull tab anchor arranged at the inner circumference, through the tubing, and extending beyond the outer circumference; and
    a book, wherein the book has a front cover and a back cover, wherein the back cover is attached to the outer circumference, and wherein the front cover comprises a strap, wherein a proximal end of the strap is attached to the front cover, and wherein the distal end of the strap is configured to secure the front cover closed.

3. A sanitary grip apparatus that may be removably attached to a shopping cart handle by a user comprising:
    a section of tubing constructed from flexible material wherein the tubing comprises a first end and a second end, wherein the tubing comprises an inner circumference and an outer circumference, and wherein the tubing further comprises a slit extending radially from the inner circumference to the outer circumference and longitudinally from the first end to the second end;
    a pair of pull tabs, wherein each pull tab is arranged on an opposing side of the slit, and wherein each pull tab extends radially from a pull tab anchor arranged at the inner circumference, through the tubing, and extending beyond the outer circumference; and
    at least one frame attached to the outer circumference of the apparatus, wherein the at least one frame comprises a pair of opposed top and bottom sides and a pair of opposed right and left sides, wherein at least two sides are secured to the outer circumference of the apparatus, and wherein the frame is configured to accommodate a transparent cover arranged between the frame and the outer circumference.

4. A sanitary grip apparatus that may be removably attached to a shopping cart handle by a user comprising:
    a section of tubing constructed from flexible material wherein the tubing comprises a first end and a second end, wherein the tubing comprises an inner circumference and an outer circumference, and wherein the tubing further comprises a slit extending radially from the inner circumference to the outer circumference and longitudinally from the first end to the second end;
    a pair of pull tabs, wherein each pull tab is arranged on an opposing side of the slit, and wherein each pull tab extends radially from a pull tab anchor arranged at the inner circumference, through the tubing, and extending beyond the outer circumference; and
a rod, wherein the rod has a first end arranged proximal to the first end of the apparatus and a second end arranged proximal to the second end of the apparatus, and further comprising slidable toys, wherein the slidable toys are mounted to the rod such that they cannot be removed from the rod.

5. A sanitary grip apparatus that may be removably attached to a shopping cart handle by a user comprising:
- a section of tubing constructed from flexible material wherein the tubing comprises a first end and a second end, wherein the tubing comprises an inner circumference and an outer circumference, and wherein the tubing further comprises a slit extending radially from the inner circumference to the outer circumference and longitudinally from the first end to the second end;
- a pair of pull tabs, wherein each pull tab is arranged on an opposing side of the slit, and wherein each pull tab extends radially from a pull tab anchor arranged at the inner circumference, through the tubing, and extending beyond the outer circumference;
- a spring-loaded clip attached to the apparatus such that an item may be secured between the clip and the outer circumference of the apparatus;
- a frame, wherein the frame is attached to the outer circumference, and wherein the frame is configured to hold a calculator;
- a zippered pouch, wherein the zippered pouch is attached around its periphery to the outer circumference; and
- a metal key ring, wherein at least one of the pull tabs is configured to receive the metal key ring.

6. A sanitary grip apparatus that may be removably attached to a shopping cart handle by a user comprising:
- a section of tubing constructed from flexible material wherein the tubing comprises a first end and a second end, wherein the tubing comprises an inner circumference and an outer circumference, and wherein the tubing further comprises a slit extending radially from the inner circumference to the outer circumference and longitudinally from the first end to the second end;
- a pair of pull tabs, wherein each pull tab is arranged on an opposing side of the slit, and wherein each pull tab extends radially from a pull tab anchor arranged at the inner circumference, through the tubing, and extending beyond the outer circumference;
- a spring-loaded clip attached to the apparatus such that an item may be secured between the clip and the outer circumference of the apparatus;
- an address book, wherein the address book has a front cover and a back cover, wherein the back cover is attached to the outer circumference, and wherein the front cover comprises a strap, wherein a proximal end of the strap is attached to the front cover, and wherein the distal end of the strap is configured to secure the front cover closed; and
- a pocket, wherein the pocket comprises a left side, a right side and a bottom side, wherein each is attached to the outer circumference of the apparatus such that the top of the pocket remains open to receive an item, and wherein the pocket is at least of a size to accommodate a cellular telephone.

7. A sanitary grip apparatus that may be removably attached to a shopping cart handle by a user comprising:
- a section of tubing constructed from flexible material wherein the tubing comprises a longitudinal slit extending radially from an inner surface of the tubing to an outer surface of the tubing;
- a pair of pull tabs, wherein each pull tab is arranged on an opposing side of the slit, and wherein each pull tab extends radially from a pull tab anchor arranged at the inner surface of the tubing such that the pull tabs may be used to separate the opposing sides of the slit from each other;
- a spring-loaded clip attached to the apparatus such that an item may be secured between the clip and the outer surface of the tubing;
- a calculator, wherein the outer surface of the tubing further comprises a frame configured to secure the calculator; and
- a zippered pouch, wherein the zippered pouch is attached around its periphery to the outer surface of the tubing.

8. A sanitary grip apparatus that may be removably attached to a shopping cart handle by a user comprising:
- a section of tubing constructed from flexible material wherein the tubing comprises a longitudinal slit extending radially from an inner surface of the tubing to an outer surface of the tubing;
- a pair of pull tabs, wherein each pull tab is arranged on an opposing side of the slit, and wherein each pull tab extends radially from a pull tab anchor arranged at the inner surface of the tubing such that the pull tabs may be used to separate the opposing sides of the slit from each other;
- a spring attached to the apparatus such that a proximal end of the spring is arranged between the inner surface and the outer surface of the tubing, and wherein a distal end of the spring has a toy attached thereto;
- a rod, wherein the rod has a first end arranged proximal to a first end of the tubing and a second end arranged proximal to a second end of the tubing, and wherein slidable toys are mounted on the rod such that they cannot be removed from the rod;
- a push button noise maker; wherein the push button noise maker is attached to the outer surface of the tubing; and
- a mirror, wherein the mirror is attached to the outer surface of the tubing.

9. A sanitary grip apparatus that may be removably attached to a shopping cart handle by a user comprising:
- a section of tubing constructed from flexible material wherein the tubing comprises a longitudinal slit extending radially from an inner surface of the tubing to an outer surface of the tubing;
- a pair of pull tabs, wherein each pull tab is arranged on an opposing side of the slit, and wherein each pull tab extends radially from a pull tab anchor arranged at the inner surface of the tubing such that the pull tabs may be used to separate the opposing sides of the slit from each other;
- a book, wherein a back cover of the book is attached to the outer surface of the tubing;
- a pocket, wherein the pocket is attached to the outer surface of the tubing such that the top of the pocket is open to receive an item, and wherein the pocket is sized to accommodate a cellular telephone;
- a frame, where the frame is attached to the outer surface of the tubing, and wherein the frame is configured to accommodate a transparent cover arranged between the frame and the outer circumference; and
- an attachment region integral with the outer surface of the tubing, wherein the attachment region comprises an attachment device, wherein the attachment device is configured to receive a reciprocal attachment device, and wherein the reciprocal attachment device can be mounted to a user defined object, and wherein the user defined object can be removably attached to the grip through use of the attachment device.

* * * * *